US008234682B2

United States Patent
Dvir et al.

(10) Patent No.: US 8,234,682 B2
(45) Date of Patent: Jul. 31, 2012

(54) SYSTEM AND METHOD FOR CENTRAL MANAGEMENT OF NETWORK AND STORAGE RESOURCES FOR A VIDEO SURVEILLANCE SYSTEM

(75) Inventors: Igal Dvir, Raanana (IL); Doron Girmonsky, Ra'anana (IL); Guy Lorman, Kfar Saba (IL); Barak Israel, Tel-Aviv (IL); Yaron Shmueli, Kfar-Saba (IL)

(73) Assignee: Nice Systems Ltd., Raanana (IL)

( * ) Notice: Subject to any disclaimer, the term of this patent is extended or adjusted under 35 U.S.C. 154(b) by 732 days.

(21) Appl. No.: 12/208,357

(22) Filed: Sep. 11, 2008

(65) Prior Publication Data

US 2010/0064337 A1 Mar. 11, 2010

(51) Int. Cl.
*H04N 7/173* (2011.01)
*H04N 7/18* (2006.01)

(52) U.S. Cl. ........ 725/115; 725/105; 725/116; 725/118; 348/143; 348/152; 348/154; 348/155

(58) Field of Classification Search .................. 725/143
See application file for complete search history.

(56) References Cited

U.S. PATENT DOCUMENTS

| 2005/0053052 | A1* | 3/2005 | Ree et al. ................. 370/352 |
| 2005/0076173 | A1* | 4/2005 | Merril et al. ................ 711/100 |
| 2005/0102704 | A1* | 5/2005 | Prokupets et al. ............ 725/118 |
| 2006/0088092 | A1* | 4/2006 | Chen et al. .............. 375/240.01 |
| 2007/0058634 | A1* | 3/2007 | Gupta et al. ................. 370/392 |
| 2007/0143467 | A1* | 6/2007 | Takahashi .................... 709/223 |
| 2007/0195186 | A1* | 8/2007 | Okada ...................... 348/333.02 |
| 2010/0017138 | A1* | 1/2010 | Brady et al. .................... 702/14 |

* cited by examiner

*Primary Examiner* — Justin Shepard
(74) *Attorney, Agent, or Firm* — Pearl Cohen Zedek Latzer, LLP

(57) ABSTRACT

System and method for central managing of network and storage resources by dynamically receiving over a network bit rate parameters related to video processing units of one or more edge devices and dynamically adjusting a bit rate of one of the processing units based on required bit rates of the processing units and bandwidth limitations of the network. The system and method may further include dynamically receiving storage parameters related to internal storage units of the edge devices and to external storage units coupled to the edge devices and instructing one of the edge devices where to store the video data based on the storage parameters and bandwidth limitations of the network.

24 Claims, 5 Drawing Sheets

SYSTEM AND METHOD FOR CENTRAL MANAGEMENT OF NETWORK AND STORAGE RESOURCES FOR A VIDEO SURVEILLANCE SYSTEM

BACKGROUND

Surveillance systems employing digital video cameras and/or audio input devices are well known. In a typical system, some or all of the video and audio signals are provided on video screens and via speakers for monitoring by security personnel. It is also known to record some or all of the signals either locally or in a remote storage device. Existing systems perform local rate control for in each edge device. The standard methods may perform optimization locally for each camera or encoder and may adjust processing parameters, such as compression ratio and bit rate based on local conditions and/or detection of predetermined events. As the number of video cameras and the number of end-users grow, local rate control is insufficient for optimization of large network-based surveillance systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
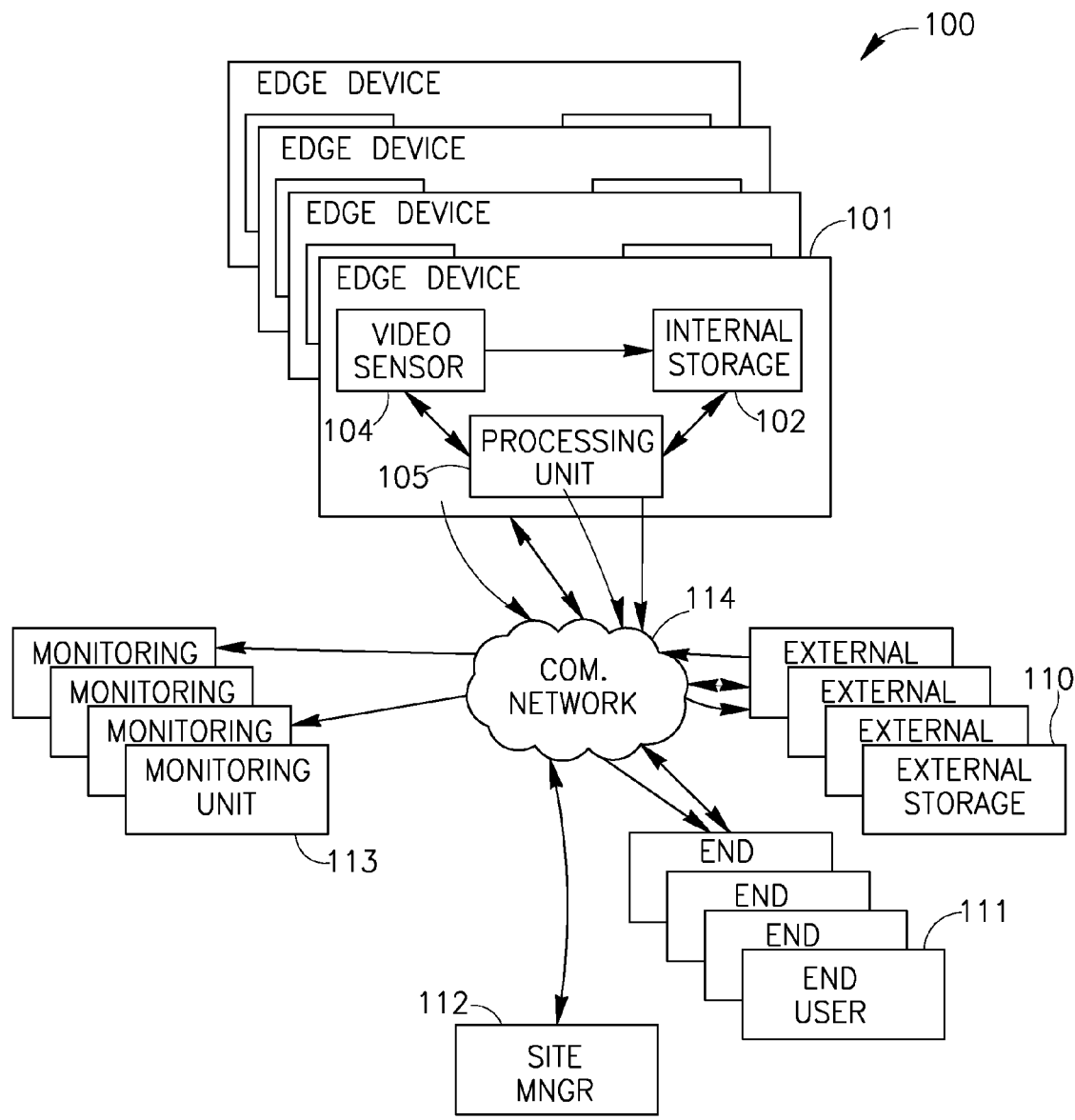
FIG. 1 is a high-level block diagram of an exemplary recording environment according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like.

Although embodiments of the invention are not limited in this regard, the terms "information" and "data" as used herein may be used throughout the specification and claims to describe any media or multi-media data, such as video data, audio data, screen capture data, alarms data, textual data or any other media or multi-media data which may be transferred between two or more devices via a communication network. Although embodiments of the invention are not limited in this regard, the term "edge-device" as used herein may be used throughout the specification and claims to describe any device able to capture and/or record data, such as video data, still image data, audio data and the like. An edge-device may be for example, a camera or any other device having sensor or other recording ability such as a mobile device, a personal computer, a lap-top and the like.

Although embodiments of the invention are not limited in this regard, the terms "end-user" or "player" as used herein may be used throughout the specification and claims to describe any device which may have the ability to receive stream of data and to perform playback and/or monitoring of data, such as, video data, still image data, audio data and the like. For example, an end-user may be a camera, a mobile device, a personal computer, a lap-top computer or the like.

Although embodiments of the invention are not limited in this regard, the terms "entity" or "device" as used herein may be used throughout the specification and claims to describe any apparatus of a recording environment, e.g., recording environment 100 of FIG. 1. the terms "entity" or "device" may describes any piece of equipment which may be connected to a communication network and may control, transfer, receive or do any other operation related to steams of data transferred in a recording environment. For example, an entity may be an end-user, an edge-device, a camera, a mobile device, a personal computer, a lap-top computer, a site manager, a storage unit or the like.

Although embodiments of the invention are not limited in this regard, the term "storage" as used herein may be used throughout the specification and claims to describe any device suitable for saving data such as memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette.

Although embodiments of the invention are not limited in this regard, the term "communication network" as used herein may be used throughout the specification and claims to describe any wireless or wired network communication network such as, a Local Area Network (LAN), a Wireless LAN (WLAN), a Metropolitan Area Network (MAN), a Wireless MAN (WMAN), a Wide Area Network (WAN), a Wireless WAN (WWAN) and networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards.

Some embodiments of the invention may be implemented, for example, using a machine-readable medium or article which may store an instruction or a set of instructions that, if executed by a machine (for example, by a computer, a mobile device and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code.

Embodiments of the present invention may provide system and method for central management of distributed video data recording systems in a surveillance recording environment. It presents optimizations methods and system architectures of recording systems which may be used for playback and analysis, for example, in video surveillance, control and supervision applications.

Some embodiments may include dynamically receiving over a network bit rate parameters related to video processing units of one or more edge devices. The processing units may process video data received in real-time and may output video data for storage and real-time monitoring applications. Embodiments of the invention may further include dynamically adjusting a bit rate of one of the processing units based on required bit rates of the processing units and bandwidth limitations of the network.

Some embodiments may further include dynamically receiving storage parameters related to internal storage units of the edge devices and to external storage units coupled to the edge devices via the network, instructing one of the edge devices where to store the video data based on the storage parameters and bandwidth limitations of the network and delivering the video data from the internal storage units or from the external storage units to an end-user, based on information received from a site manager Embodiments of the invention may be performed by a site manager which may control the recording environment by management of resources, allocation of system resources and different environment architecture, for example, determining, for each edge-device, whether to store data, such as video data, in a local storage or in a remote storage, controlling parameters of sensors in the recording environment, controlling the bandwidth usage of entities in the recording environment and the like.

Reference is now made to FIG. 1, which is high-level block diagram of an exemplary recording environment according to embodiments of the present invention. Recording environment 100, also referred herein to as "system", may be, for example, a video surveillance environment and may include one or more edge-devices 101, such as video cameras or encoders. Edge-device 101 may include a video sensor 104 to capture video data, a processing unit 105 process video data received in real-time and to output video data for storage in an internal storage 102 such as a hard disk drive or for real-time monitoring applications. Edge-device 101 may include any other modules, units or elements to allow sensing, capturing and processing of data, such as video data.

Although some demonstrative embodiments of the invention may describe operations which may be performed by the edge-device 101 or by elements included in the edge-device, such as sensor 104 or processing module 105, it should be understood to a person skilled in art that the invention is not limited in this respect and according to embodiments of the present invention any suitable element or module of edge-device 101 may perform such operations. For example, some embodiments may use sensor 104 to perform a certain action, however, other implementation of the same embodiments may use processing unit 105 or edge-device 101 to perform the same action.

Recording environment 100 may further include one or more external storages 110, a site manager 112 one or more monitoring units 113 and one or more end-users 111 all coupled to one or more edge-devices 101 via a wired or wireless communications network 114, for example, via an Internet Protocol (IP) network.

Management of all resources of environment 100 may be performed by site manager 112. Site manager 112 may control, manage and synchronize entities and resources in environment 100 in order to overcome limitations such as bandwidth, bit rate and real time limitations of entities, such as sensors 104, monitoring units 113 and end-users 111.

Site manager 112 may be a processing system or a computer and may include a local memory, processor, input and output devices, mass storage device, operating system and supporting software. Site manger may include any code, software, hardware or embedded code that when executed may result in controlling and managing system 100 by allocating system resources as described in detail with reference to embodiments of the invention Site manager 112 114 have information regarding the topology and structure of recording environment 100 or any other information regarding recording environment 100 to allow management of recording, playback, monitoring and data analysis in recording environment 100.

Site manager 112 may receive over communication network and may store information or parameters regarding the requirements and limitations of entities in environment 100. For example, site manager 112 may dynamically receive bit rate parameters such as the required bit rate of each processing unit 104 and/or sensor 104, bandwidth limitation of network 114, the required or supported bandwidth of internal storage 102 and external storage 110, the required bandwidth for monitoring unit 113, performance limitation of different entities in environment 100 and the required bandwidth for playback by each of end-users 111.

Site manager 112 may receive additional information regarding limitations, requirements and priorities from entities in environment 100. Site manager 112 may include a pre-defined list of requirements, may receive a list of the requirements and limitation from the entities in environment 100 or from a system administrator. Site manager 112 may dynamically receive an update of requirements, limitations and changes of requirements and limitations from entities. The requirements and limitation of entities in environment 100 may be delivered to site manger 112 by any way or method.

Site manager 112 may control the recording process and may optimize the performance of environment 100 by, for example, controlling sensors 104 and processing units 105, adjusting them, determining where to save recorded data and by centrally managing all entities of environment 100 based on a plurality of requirements and limitations of entities in environment 100. For example, site manager 112 may dynamically adjust a bit rate of one or more of processing units 105 based on required bit rates processing units 105 and bandwidth limitations of a rate of transferring bits of data of network 114.

Each sensor or a plurality of sensors 104 may further include one or more A/D (analog to digital) converters to receive the video data. Each sensor 104 and processing unit 105 may have its own requirements of bit process, transfer bit rate and performance under pre-defined configuration. A bit rate control may change, for example, parameters of the compression of a captured data according to motion, noise, texture or any other parameter in the captured data that may influence the bit rate. The rate control of each sensor, processing unit or multiple sensors 104 or processing units 105 may use its own control loop to change the compression algorithm and parameters in order to keep the required bit rate, for example, bit rate may be 256 Kilobytes per second, 8 megabytes per second or any other number of data bytes per second. Embodiments of the present invention may enable optimization of the performance of a system by presenting a centralized or global bit rate control for sensors 104, processing units 105 by site manager 112.

Site manager 112 may have a list of all sensors 104 and processing units 105 in environment 100. Each sensor 104 and/or processing unit 105 may have a required bit rate and a priority and/or any other parameters that may be used by site manager 112 to define a specific bit rate for a specific sensor 104 and specific processing unit 105 at a specific time. The priority of sensor 104 may be static and therefore pre-defined or dynamic according to motion, area of interest, limitation or any other.

Site manager 112 may calculate and statically or dynamically adjust and optimize the bit rates of edge-device 101, e.g., the bit rate of sensors 104 or/and processing units 105 and the bandwidth used by entities in environment 100 so it may be optimized according to the priorities and the other limitations. Site manager may change the bit rates of each of sensors 104 globally according to dynamic changes in environment 100. For example, if a certain edge-device 101 has higher priority, then it may get higher bit rate than the other edge-devices, or when dynamically one of the edge-devices may need higher bit rate site manager 112 may lower the bit rate from another edge-device so the total bandwidth of the networking, streaming and storage of environment 100 may remain according to its limitations.

According to other embodiments, environment 100 may have storage limitations or specific requirements and each edge-device 101 may have its own required bit rate. If a first edge-device 101 does not have to use the full bit rate since, for example, there is no motion at a captured video data, site manager 112 may allow other edge-devices to use the extra available bit rate that the first edge-device 101 does not use and may enable higher bit rate to other edge-devices. Site manager 112 may also check if extra or free bandwidth may be used for storage, streaming or encoding of data. If, for example, the system has limited bandwidth and dynamically one of edge-device 101 may not have to capture motion in the recorded video data, the bit rate of the a specific edge-device may be reduced. Site manager 112 may decide to increase the bit rate of one or more of the other edge-devices 101 according to priorities, limitations and parameters. According to other embodiments, site manager 112 may decide to stop one or more edge-device in order to reduce the size of data stream due to insufficient bandwidth for transmission of all captured data from all the edge-devices 101 over network 114.

Some embodiments of the invention may provide a global system for optimization based on time-related parameters. Site manager 112 may take into consideration varying requirements during different time or hours in a day, a part of a day, a week or any period of time. Site manager 112 may allow entities of system 100 to use high bit rates during specific period of times based on the knowledge or information that during other times a lower bit rate is required.

For example, in a surveillance environments motion at a recorded scene may vary during different days or during different times of a day, e.g., during night time the activity is lower than during the day time and thus the level of motion may be expected to be lower during night time hence a lower bit rate may be used by edge-device 101 to keep a certain quality level. Site manger 112 may decide to lower the bit rate during low activity times and may use the un-used bit rate during high activity times.

The configuration of entities in environment 100 may be done by site manger 112 statically when a user or a system administrator knows in advance when a higher or lower bit rates may be required. In other situation the configuration may also be done dynamically, for example, site manger 112 may collect and use statistics from edge-devices 101, e.g., of sensors 104 or processing units 105 during different times and calculate that in a certain time the bandwidth requirements are higher or lower than other time, and may divide the bandwidth resources between edge-devices 101 accordingly. For example, if a required bit rate is decreased at one time, site manger 112 may provide more bandwidth or storage space to other edge-devices at different time in order to keep the average bandwidth and/or storage requirements.

Environment 100 may dynamically be adjusted by site manager 112, for example, by adjusting a plurality of parameters such as, available bandwidth, overall quality of the link between devices in environment 100. Such adjustments or changes may result in a plurality of events such as delay, jitter and packet loss. A video surveillance system, such as environment 100, may be susceptible to those changes, which may lead to degraded video quality and degraded overall security efficiency. In order to prevent such efficiency degradation, site manger 112 may statically and/or dynamically allocate resources in environment 100 among a plurality of end-clients, such as, edge-devices 101, monitoring units 113, external storages 110 and end-users 111.

Site manager may communicate with network 114, e.g., with a network administrator, and a plurality of entities in environment 100, may query network 114 about its resources, e.g., entities in environment 100, and may implement based on the information gathered or dynamically received logic decisions, such as business logic decisions. Such a control of environment 100, also referred to herein as Video Admission Control (VAC) may improve a video quality in all networking architectures, such as for example, LAN, MAN and WAN systems and with all networking media, such as wire-line and wireless networks.

Site manager 112 may utilize VAC by implementing Policy Decision Function (PDF) which may allocate resources of environment 100 across several end-users 111 according to priority, Service Level Agreement (SLA) or other parameters. Such a solution may be centralized, and may define the route between each source to its target, may optimize the network resources and may make sure that video may be delivered in a required quality.

In another embodiment of the invention an in-band signaling protocol may be implemented, such a protocol may reserve resources for a specific end-user 111 or a specific device. For example, implementing Resource Reservation Protocol (RSVP) in edge-device 101, so when edge-device 101 may wish to transfer a data stream, it may send a message to a network router to reserve a sufficient bandwidth for the transferred data stream. When a path for the data delivery may be allocated by network 114, an approval message may be sent back from network 114 to edge-device 101 and edge-device 101 may start to stream the data.

When there are not enough resources for transferring the data stream, for example when a certain router of network 114 is congested, with, for example, implementations of out-of-band management, site manager 112 may try to find an alternate path for transferring the data, e.g. an available router with a sufficient resources. Site manager 112 may propagate a request towards a target, for example, monitoring unit 113 or external storage 110 and in case a reserved path has been successfully allocated, site manger 112 may notify edge-device 101 to start streaming the data, e.g., video data. For example, a VAC message may be propagated by site manger 112 until a resource may be allocated for transferring the data.

In case site manger 112 may not find or allocate available resources for the data stream, for example, the required bandwidth according to the request of edge-device 101 may not be found; edge-device 101 may retry and send a resource reservation request again, within a predefined time window after a certain period of time from a first resource reservation request. Such process may be done for several times, until the required bandwidth may be allocated, for example, after end-user 111 finished play-back during the timeframe resources may be released. In case a time window has passed and the bandwidth may not be reserved, site manager 112 may allocate different bit rate for a first edge-device 101 or may change the bit rate of a second edge-device 101 in order to give the required bit rate for the first edge-device 101 The allocation of resources may be done by site manager 112 statically or dynamically according to priorities.

Embodiments of the invention may provide centralized management which may consist of dynamically gathering or receiving information from entities in environment 100 by site manger 112. For example, large sites or recording environments 100 may include a large number of sensor 104 each may have different requirements and statistics which may be dynamically, in real-time, delivered to site manager 112 and may be used to adjust in order to optimize the use of system resources. The optimization may be done by resources management and control of edge-devices 101 by site manager 112, e.g., allocate more resources to edge-devices which may need more on the expense of those edge-devices which may need less and by direct architecture of environment 100 to utilize storage to optimize the bandwidth utilization in real-time applications.

For example, site manger 112 may decide whether to save recorded data streams locally on internal storage 102 or on external storage 110. In addition, monitoring may be done directly from edge-devices 101 while playback may be done from any storage in environment 100, a direct architecture of environment 100 may provide a plurality of implementations to manage data as described in detail below with reference to FIG. 2 and FIG. 3.

Although in the exemplary illustration of FIG. 1, four external storages, four edge-devices, four end-users, four monitoring units and one site manager are shown, it should be understood to a person skilled in art that the invention is not limited in this respect and according to embodiments of the present invention, recording environment 100 may include any suitable numbers of external storages, edge-devices, end-users, monitoring units or site managers.

Figure 2:
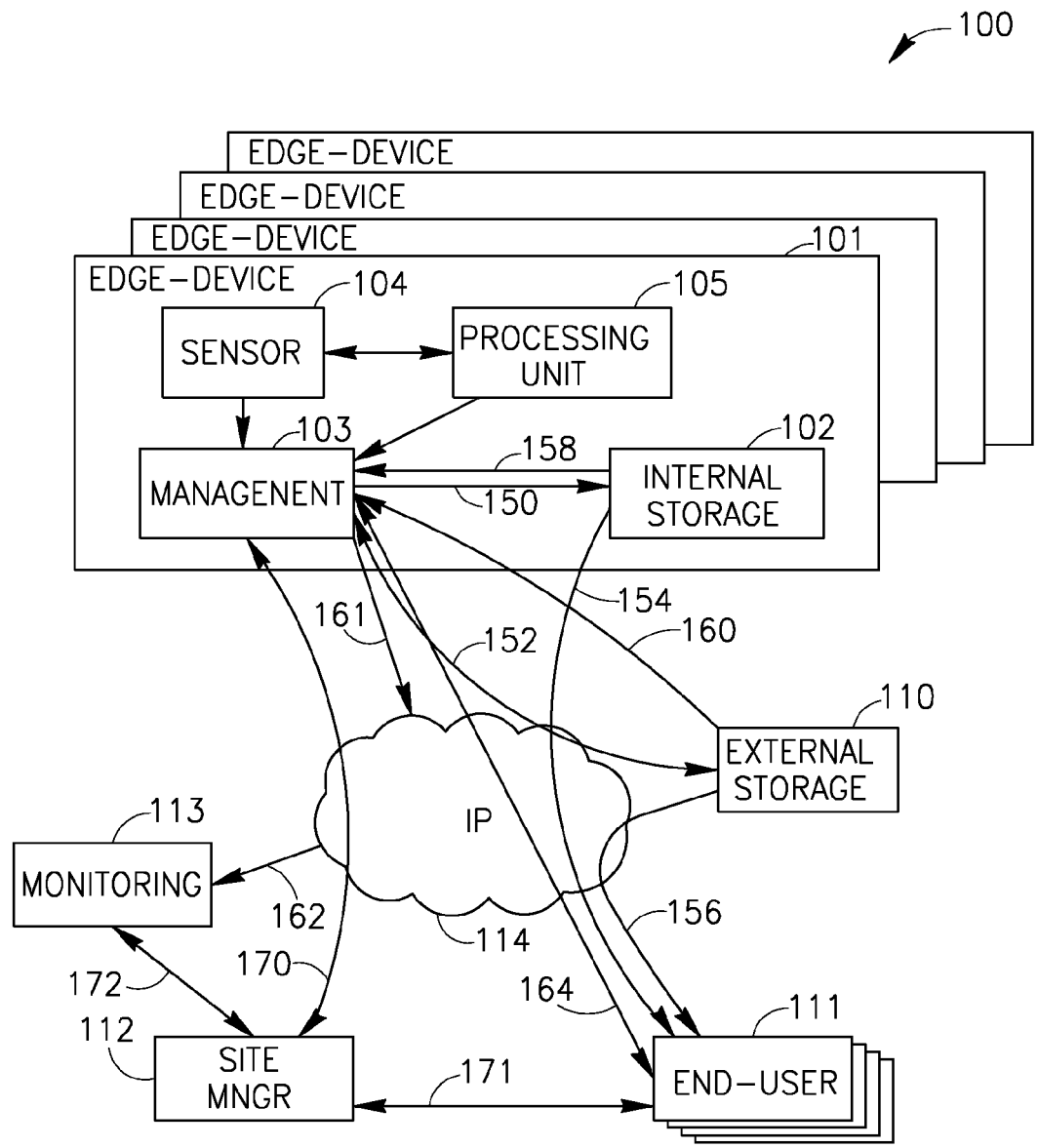
FIG. 2 is a block diagram of an exemplary recording environment according to embodiments of the present invention.

Reference is now made to FIG. 2, which is a block diagram of an exemplary recording environment according to embodiments of the present invention. Recording environment 100 may include one or more edge-devices 101 each may include one or more sensors 104, one or more processing units 105 and a management module 103. Edge-device 101 may record and store data in an internal storage 102 and/or in an external storage 110. External storage 110 may be coupled to edge devices 101 via network 114.

Recording environment 100, also referred herein to as "system", may further include a site manager 112, a monitoring unit 113 and one or more end-users or players 111 all coupled to one or more edge-devices 101 via a wired or wireless communications network 114, for example, via an Internet Protocol (IP) network.

Sensors 104 may sense, collect and capture analog or digital input information, such as, video data, audio data, textual data and the like and may transfer the collected input information to processing module 105.

Processing module 105 may process the collected information, also refereed to herein as "raw data". The processing may include, for example, analog to digital conversion of the data, data compression, data analysis, addition of information related to the data, also known as "metadata". Any other flow, method or algorithm of data handling or processing may be performed by processing module 105.

Management module 103 may control sensors 104, internal storage 102 and processing module 105 and may control transferring and/or streaming the processed data e.g., analyzed data and/or compressed data, from processing module 105, for monitoring purposes or for storing and later playback purposes as described in detailed below with reference to embodiments of the present invention.

According to some embodiments of the invention, management module 103 may control the processed data transfer from processing module 105 internally, for storage in internal storage 102 as indicated by arrow 150 or over network 114, for storage in external storage 110 as indicated by arrow 152. The data may be transferred and saved in internal storage 102 and/or external storage 110 by using Ethernet protocols such as iSCSI, Intermediate Frequency (I/F) protocols such as, USB, eSATA or any other communication infrastructure or protocol.

Site manager 112 may control, manage and synchronize entities in environment 100. Site manager 112 may have information regarding topology and structure of recording environment 100 or any other information regarding recording environment 100 to allow management of recordings, playback, monitoring and data analysis in recording environment 100. Site manager 112 may dynamically receive storage parameters from internal storage units 102 of edge devices 101 and from external storage units 110 and may instruct each edge device 101 where to store the video data based on the storage parameters received from internal storage units 102 and the externals storage units 110.

The received information or parameters may include, for example, channels to be recorded and storage information. The storage information may relate to all the storages of recording environment 100, e.g., internal storage 102 and/or external storage 110 and may include each storage structure and framework. The storage framework information may include, for example, information on where each channel is being recorded, which sensor used for the recording, storage layout including, for example, buffers location, buffers size, linked lists, index file or any other information.

According to embodiments of the invention, during initialization of recording environment 100 site manager 112 may initiate processing unit 105 via management module 103, as indicated by arrow 170 and may inform each of edge-devices 101, which channel to record, which parameters to use for the recording and where to store the recorded data. Site manager 112 may initiate end-users 111, as indicated by arrow 171 and may inform or transfer each end-user 111 the topology or structure of recording environment 100 and specifically the location of recorded data from each of the recorded channels.

Embodiments of the invention may allow direct and/or non-direct playback. In direct playback, end-user 111 may read the stored data directly from internal storage 102, as indicated by arrow 154, or directly from external storage 110, as indicated by arrow 156, based on information from site manager 112. In non-direct playback, the playback process may be performed via edge-devices 101, specifically via management module 103, e.g., the stored data may be transferred to management module 103 from internal storage 102, as indicated by arrow 158, or from external storage 110, as indicated by arrow 160 and from management module 103 to end-user 111 as indicated by arrow 164.

Although the scope of the invention is not limited in the respect, the data to be saved in internal storage 102 and/or external storage 110 may include media such as video data, audio data, alarms, events and the like. In addition to the recorded data, additional data or information may be saved in internal storage 102 and/or external storage 110. The data or information to be saved may include metadata related to the original recorded data or raw data.

Metadata may be extracted from raw video data and may include, for example, objects, motions, people counting, scenes, backgrounds information or any other information. Metadata may be extracted from raw audio data and may include, for example, word spotting, continuous voice recognition information, speaker identification and recognition or any other information. Metadata may be extracted from alarms and events and may include, for example, location information, internal and/or external, triggers used to start an event, such as opening a door, push button and the like.

According to embodiments of the present invention, the data or information to be saved in internal storage 102 and/or external storage 110 may include channel information and parameters such as, for example, channel number, recorded media type, recorded media parameters, recording time and date and/or any other information. Additionally or alternatively the data to be saved may include management information, such as, for example, buffers sizes, recorded channels and the like.

Although the scope of the invention is not limited in the respect, information or storage parameters related to the stored data may be stored or saved in a table format, also referred to herein as an "index table". The index table may be saved in internal storage 102 and/or external storage 110, preferably in the storage in which the recorded data itself is being saved. The index table may be managed and updated by processing module 105 or by site manager 112. A copy of the index table may also be saved in additional components of recording environment 100. For example, site manager 112 and/or end-users 111 may save a cached index table to increase the efficiency of recording environment 100 by avoiding accesses to processing module 105 for reading information. Processing module 105 may dynamically, in real-time, update the index table and the cached index tables upon having new information, for example, from site manager 112, as described in detail below.

During operation or normal work, site manager 112 may dynamically update, in real time end-users 111 and/or edge-devices 101 upon any change in recording environment 100, for example, any change in architecture of recording environment 100, number of edge-device 101, sensor 104 parameters and the like. In addition, each end-user 111 may request to receive information from site manager 112. The information may include, for example, on which storage recorded data of specific channels may be found, location of a specific storage and location of a specific recorded data in the storage. Such information may be retrieved by each end-user 111 from its cached index table to allow accelerated management time. When site manager 112 may be disconnected, end-user 111 and monitoring unit 113 may have the last site model and the cached index table and may request and receive additional information directly from management module 103 of edge-devices 101.

End-users 111 may wish to receive or retrieve recorded data and may request site manager 112 to identify required information, such as on the specific recorded channel required. Site manager 112 may inform end-users 111 which edge-device 101 has recorded the required data and on which storage the data has been stored, e.g., internal storage 102 and/or external storage 110.

According to some embodiments of the invention, end-users 111 may read the data directly from internal storage 102, directly from external storage 110 and/or through processing units 105 of edge-devices 101. End-users 111 may use iSCSI protocol or any other protocol to read the stored data.

The cached index table kept by end-users 111 may save time during play-back process and update of the cached index table may be performed by updating only information which was changed instead of reading the entire information of the index table from edge-device 101 at each update.

Monitoring unit 113 may control live monitoring of video, audio, alarms metadata or any other sensed data. Monitoring unit 113 may request and receive the location of a specific channel from site manager 112 as indicated by arrow 172. Site manager 112 may inform monitoring unit 113 which edge-device 101 is sensing and recording a specific channel. Monitoring unit 113 may request an edge device 101 to stream the data from a specific processing unit 105 and the processing unit 105 may send, transmit or stream the data through network 114 to monitoring unit 113 as indicated by arrows 171 and 172.

Although in the exemplary illustration of FIG. 2, each edge-device 101 is shown as having sensor 104, processing module 105, management module 103 and internal storage 102, it should be understood to a person skilled in art that the invention is not limited in this respect and according to embodiments of the present invention, any other configuration having similar functionality may be used. For example, sensor 104, processing module 105, management module 103 and internal storage 102 may each be implemented as a separate unit.

Although in the exemplary illustration of FIG. 2, one internal storage, one external storage, four edge-devices, four end-users, one monitoring unit and one site manager are shown, it should be understood to a person skilled in art that the invention is not limited in this respect and according to embodiments of the present invention, recording environment 100 may include any suitable numbers of internal storages, external storages, edge-devices, end-users, monitoring units or site managers.

Figure 3:
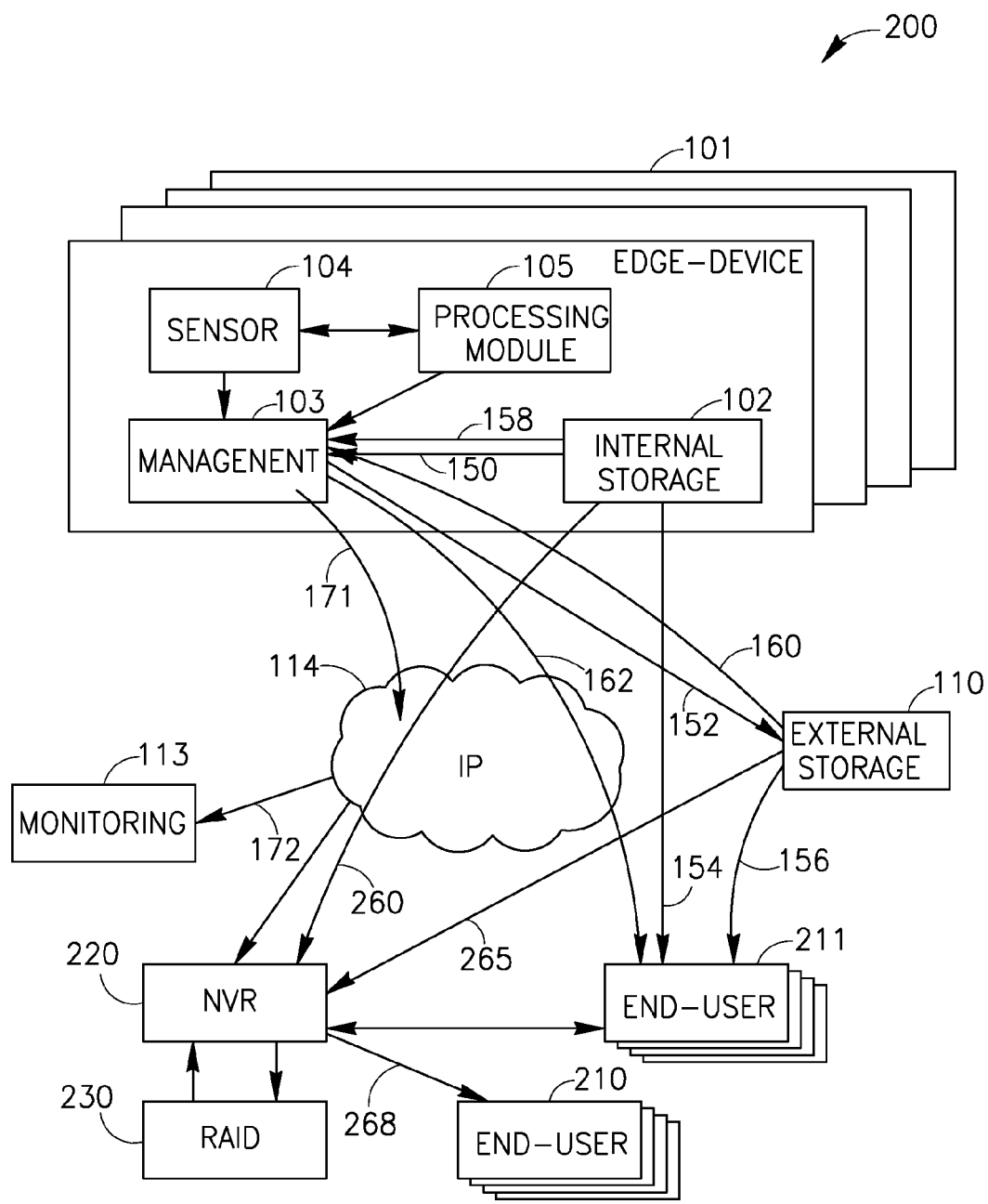
FIG. 3 is a block diagram of an exemplary recording environment having a network video recorder according to embodiments of the present invention.

Reference is now made to FIG. 3, which is high-level block diagram of an exemplary recording environment with a network video recorder (NVR) according to embodiments of the present invention. Recording environment 200 may include one or more edge-devices 101, each may include one or more sensors 104, one or more processing units 105 and a management module 103. Edge-device 101 may record and store data in an internal storage 102 and/or in an external storage 110. External storage 110 may be coupled to edge devices 101 via network 114.

Recording environment 200 may further include NVR 220, a monitoring unit 113 and one or more end-user 211 all coupled to edge-devices 101 via a wired or wireless communications network 114, for example, via an Internet Protocol (IP) network.

According to embodiments of the present invention, NVR 220 may have the same functionality of site manager 112, as described with reference to FIG. 1, as well as additional features as described below. Recording environment 200 may provide the functionality and features provided by recording environment 100 of FIG. 1, as well as additional features provided by NVR 220.

Recording may be performed by edge-devices 101 and may be saved on local storage 102 and/or on external storage 110 as is detailed described with reference to FIG. 1. Although the scope of the invention is not limited in the respect, information related to the stored data may be stored in an "index table". The index table may be saved in internal storage 102 and/or external storage 110, preferably in the storage in which the data itself is being saved, and may be managed and updated by processing module 105. A cached index table may also be saved in additional components of recording environment 200. For example, NVR 220 and/or end-users 211 may save a cached index table to increase the efficiency of recording environment 200 by avoiding accesses to processing module 105 for reading information. Processing module 105 may dynamically, in real-time, update the index table and the cached index tables upon having new information, for example, from NVR 220.

Embodiments of the invention may allow playback via NVR 220 in addition to the direct and/or non-direct playback. In direct playback, end-user 211 may read the stored data directly from internal storage 102, as indicated by arrow 154, or directly from external storage 110, as indicated by arrow 156, based on the information from NVR 220. In non-direct playback, the playback process may be performed via edge-devices 101, specifically via management module 103. The stored data may be transferred to management module 103 from internal storage 102, as indicated by arrow 158, or from external storage 110, as indicated by arrow 160 and from management module 103 to end-user 211 as indicated by arrow 162.

Playback through NVR 220 may be used when a large number of end users 210 may need to read the stored data and when direct playback from internal storage 102 and/or storage 110 and indirect playback through management module 103 may not provide or support the playback required, due to technical limitations such as, a low bandwidth, a required bandwidth, a required processing power and the like. NVR 220 may read the stored data directly from internal storage 102, as indicated by arrow 260, or directly from external storage 110, as indicated by arrow 265. End users 210 may playback the recorded data via NVR 220, as indicated by arrow 268.

NVR 220 may be coupled to a local storage 230 which may be a Redundant Arrays of Inexpensive Drives (RAID) such that once the data was transferred to NVR 220 it may be saved in RAID 230 and NVR 220 may transfer the recorded data to end-users 210 from RAID 230. NVR 220 may allow a large number of end-users to playback stored data at the same time, as NVR 220 may amplify or enlarge the ability of transferring stored data to end-users 211.

Embodiments of the invention may allow end-users 211 to read the stored data directly from internal storage 102 or directly from external storage 110 without using NVR 220 while end-users 210 may read the stored data from NVR 220. For example, when NVR 220 is physically distant from an end-user 211, end-user 211 may read data directly from storage 110 as indicated by arrow 156 while end-users 210 may read data through NVR 220 as indicated by arrow 268.

In some embodiments of the invention, NVR 220 may use the live monitoring for recording purposes. In situations of a problem in network 114, NVR 220 may resume the data using playback from the internal storage 102 or external storage 110 which may be physically closer to monitoring unit 113 than end-user 210.

Figure 4:
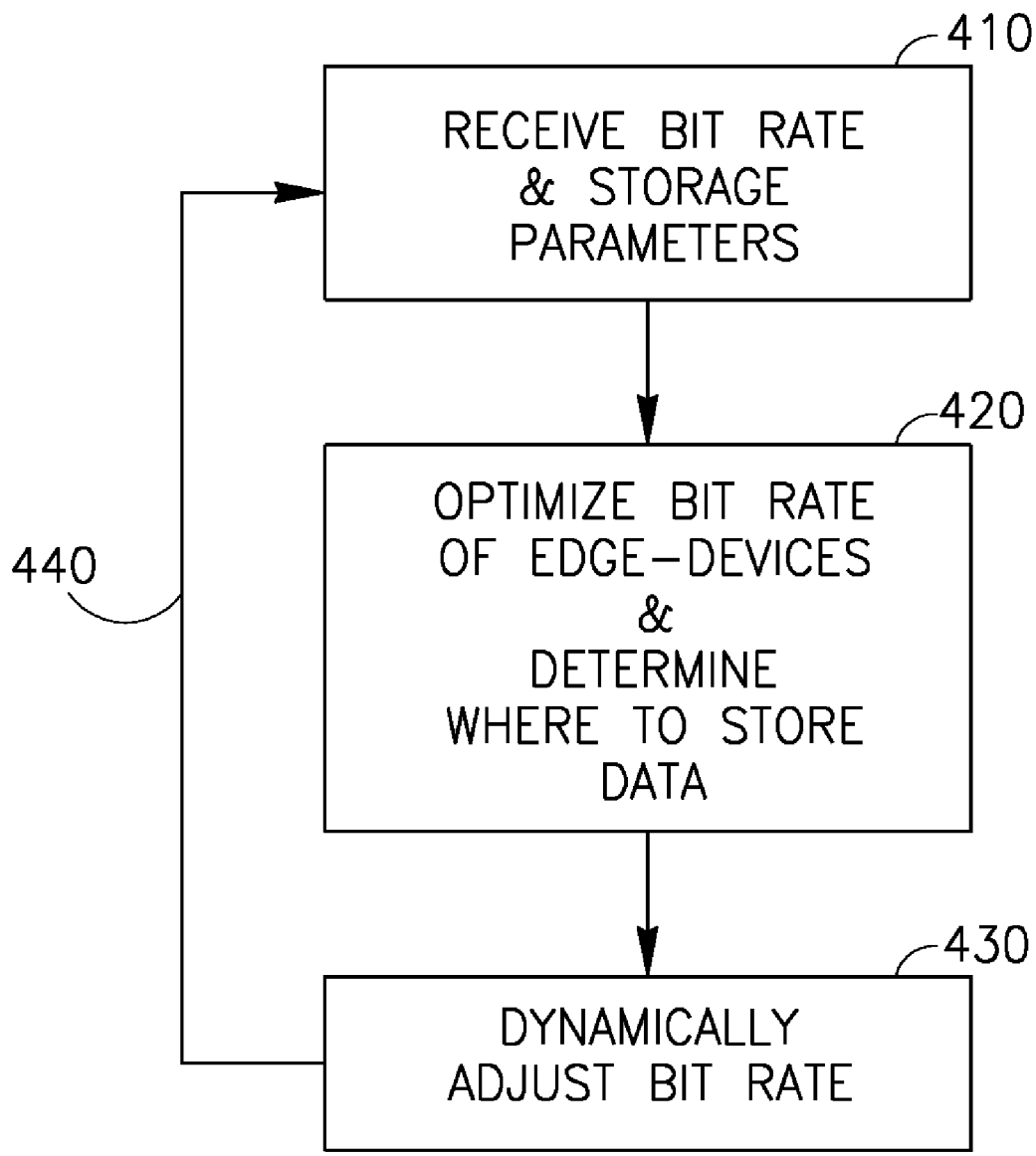
FIG. 4 is a flowchart of a method for direct playback in a recording environment having a plurality of storages according to embodiments of the present invention.

Reference is now made to FIG. 4, which is a flowchart of a method for managing distributed video data in recording systems according to embodiments of the present invention. Operations of the method may be implemented, for example, using recording environment 100 or recording environment 200, by one or more of the elements in recording environment 100 or recording environment 200 and/or by other suitable units, devices, and/or systems.

As indicated at box 410, the method may include dynamically receiving by a system manager, e.g., site manager 112, bit rate parameters related to video processing units of edge devices, e.g., edge-devices 101. The processing units, e.g., processing unit 105, may process video data received in real-time and may output the video data for storage and real-time monitoring. In addition, the method may include receiving a system manager storage parameters from internal storage units of the edge devices and from external storage units coupled to the edge devices via a network.

As indicated at box 420, the method may include optimizing the bit rate of each of the edge-devices 101. The optimization may be performed by site manager 112 and may include calculating, processing and executing of an optimization algorithm based on the received parameters. Further, the method may include determining by site manager 112 where to store data based on the storage parameters received from internal storages and external storages. For example, recorded data may be stored in an internal storage the edge-device. E.g., storage 102 or in storage external to the edge-device, e.g., external storage 110.

As indicated at box 430, the method may include dynamically adjusting the bit rate of processing units of each edge-device based on required bit rates of the processing units and bandwidth limitations of the network. The adjustment may be performed based on real-time reception of bit rate parameters as indicated by arrow 440.

The adjustment which leads to optimization may be done also on timely basis, for example if during a day time there may be more motion to be captured than during a night time the edge devices may need higher bit rate than at night time when the motion may be deceases.

The optimization may be done based on local bit rate requirements of each of edge-devices 101, parameters related to each edge-device 101, network limitations and storage parameters. The integration and optimization may be done using pre-defined data and real-time data received by site manager 112 according to varying requirements during different time periods and may include integration over time of requirements of edge-devices 101.

Figure 5:
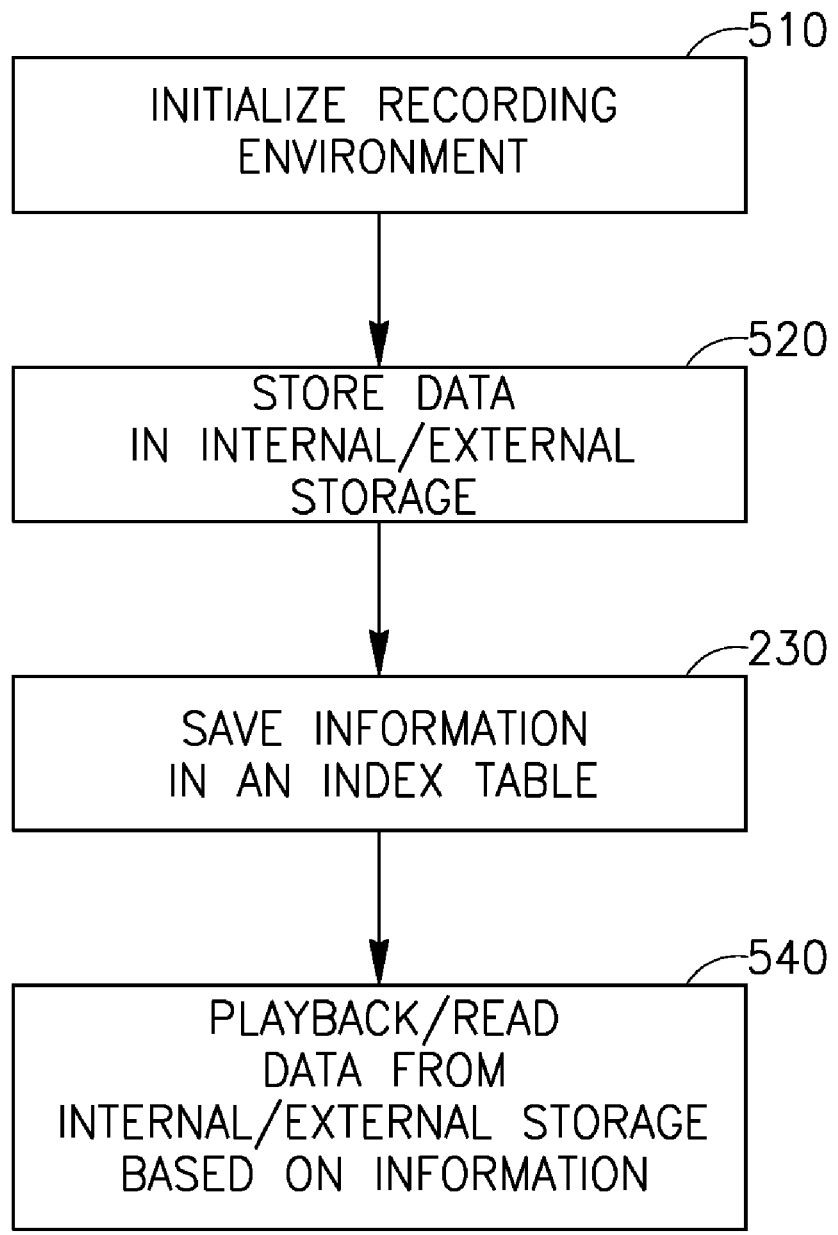
FIG. 5 is a flowchart of a method for direct playback in a recording environment having a plurality of storages according to embodiments of the present invention.

Reference is now made to FIG. 5, which is a flowchart of a method for direct playback in a recording environment having a plurality of storages according to embodiments of the present invention. Operations of the method may be implemented, for example, using recording environment 100 or recording environment 200, by one or more of the elements in recording environment 100 or recording environment 200 and/or by other suitable units, devices, and/or systems.

As indicated at box 510, the method may include initializing elements or devices of recording environment 100 by a site manager or a NVR, for example, site manager 112 of FIG. 1 or NVR 220 of FIG. 2. Initialization process may include determining and providing each edge-device of the recording environment, for example, edge-device 101 information regarding the recording process. The information may include, for example, which channel to record, which parameters to use, which storage to use for each recorded channel and the like.

Initialization process may also include providing end-users or players of the recording environment, for example, end-users 111, the topology or structure of recording environment 100 and specifically storage parameters such as the location of recorded data from each of the recorded channels. It should be understood to a person skilled in the art that initializing recording environment may include any other suitable steps, operations or sets of operations.

As indicated at box 520, the method may include storing recorded data, such as video data, audio data or any other recorded data in internal storage or/and in external storage. Internal storage may be a local storage of the recording device, for example, internal storage 102 while external storage may be a remote storage, e.g., located physically away from the recorded device, for example, external storage 110. The information whether to store a recorded data in an internal storage or in an external storage may be received from a central management unit such as site manager 12 during the initializing process and may be adjusted dynamically in real-time. Any other suitable steps, operations or sets of operations.

As indicated at box 530, the method may include saving or storing information related to the recorded data, such as metadata, channel information and parameters such as, for example, channel number, recorded media type, recorded media parameters, recording time and date and/or any other information. Such data or information may be stored or saved in a table format, also referred to herein as an "index table". Such an index table may be saved in internal storage, for example, internal storage 102 and/or external storage for example, external storage 110, preferably in the storage in which the recorded data itself is being saved. A copy of the index table may also be saved in additional components of recording environment. For example, site manager 112 of FIG. 1, NVR 220 of FIG. 2 and/or end-users 111 may save a cached index table to increase the efficiency of the recording environment by avoiding accesses to edge devices, for example, edge devices 101, for reading information.

The method may further include dynamically, in real-time, updating the index table and the cached index tables upon having new information from, for example, site manager 112 or NVR 220 by repeating the method steps described by boxes 520 and 530.

As indicated at box 540, the method may include reading or play-backing the recorded data using direct and/or non-direct playback from internal storage or from external storage. In direct playback, an end-user, for example, end-user 111 may read the stored data directly from internal storage, e.g., internal storage 102 or directly from external storage, e.g., external storage 110 based on the information received from a management unit, for example, from site manager 112 of FIG. 1 or NVR 220 of FIG. 2. In non-direct playback, the recorded data may be transferred to an end-user via the edge device which recorded the data. For example, the stored data may be transferred from an internal storage or from an external storage to a management module in the edge device which recorded the data and from management module to an end-user.

Each end-user may request to receive information from a management module, for example, site manager 112 or NVR 220. The information may include, for example, on which storage recorded data of specific channels may be found, location of a specific storage and location of a specific recorded data in the storage. Such information may be retrieved by each end-user from its cached index table to allow accelerated management time.

Embodiments of the invention may allow playback via an NVR, for example, NVR 220 of FIG. 2 in addition to the direct and/or non-direct playback. Playback through NVR may be used when a large number of end users may need to read the stored data. The NVR may read the stored data directly from internal storage or directly from external storage.

Any other suitable steps, operations or sets of operations may be used in reading the stored data.

Some embodiments may be provided in a computer program product that may include a machine-readable medium having stored thereon instructions, which may be used to program a computer, or other programmable devices, to perform methods as disclosed above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for managing distributed video data in recording systems, the method comprising:
dynamically receiving over an Internet Protocol (IP), network from video cameras bit rate parameters related to video processing units of the respective video cameras, wherein the processing units are to process video data received in real-time and to output the video data for storage and real-time monitoring;
dynamically adjusting a bit rate of one of the processing units based on required bit rates of the processing units and bandwidth limitations of the network;
dynamically receiving internal storage parameters related to internal storage units of the video cameras and external storage parameters related to external storage units coupled to the video cameras via the network; and instructing one of the video cameras where to store the video data based on the storage parameters and bandwidth limitations of the network.

2. The method of claim 1, wherein the bit rate parameters comprise bit processing requirements of the processing units.

3. The method of claim 1, wherein the bit rate parameters are based on bit processing priorities of the processing units.

4. The method of claim 1, wherein adjusting the bit rate of one of the processing units and instructing one of the video cameras where to store the video data are to centrally optimize the performance of the video cameras.

5. The method of claim 1, wherein adjusting is based on pre-defined data and real-time data according to varying requirements during different time periods.

6. The method of claim 1 further comprising: delivering the video data from the internal storage units or from the external storage units to an end-user, based on information received from a site manager.

7. The method of claim 1, further comprising initializing the video cameras by providing each video camera with information related to recording and storing of the video data.

8. The method of claim 6, comprising playing back video data from the internal storage units or from the external storage units by said end-user.

9. The method of claim 6, comprising playing back video data from said internal storage units or from said external storage units, wherein the data is being transferred from the internal storage units or from said external storage units to the end-user via the video cameras.

10. The method of claim 1, wherein the storage parameters are being saved in a table format in the internal storage units or the external storage units.

11. The method of claim 1 comprising adjusting the bit rate of the video cameras based on the storage parameters.

12. A video recording system comprising:
video cameras connected to an Internet Protocol (IP) network, each video camera comprising a sensor to record video data, a processing unit to process the video data received in real-time and to output the video data and an internal storage unit to store the video data; and
a site manager to dynamically receive over the IP network from the video cameras bit rate parameters related to video processing units of the respective video cameras, internal storage parameters related to internal storage units of the video cameras, and external storage parameters related to external storage units coupled to the video cameras via the network, the site manager to adjust a bit rate of one of the processing units based on required bit rates of the processing units and bandwidth limitations of the network and to instruct one of the video cameras where to store the video data based on the storage parameters and bandwidth limitations of the network.

13. The system of claim 12 further comprising: an end-user device coupled to the site manager to receive the video data from the internal storage units or from the external storage units based on information received from the site manager.

14. The system of claim 12, wherein the bit rate parameters comprise bit processing requirements of the processing units.

15. The system of claim 12, wherein the bit rate parameters are based on bit processing priorities of the processing units.

16. The system of claim 12, wherein the site manager is to centrally optimize the performance of the video cameras.

17. The system of claim 12, wherein the site manager is to initialize the video cameras by providing each video camera with information related to recording and storing of the video data.

18. The system of claim 13, wherein the end-user is to play-back video data from the internal storage units or from the external storage units.

19. The system of claim 12, wherein the storage parameters are being saved in a table format in the internal storage units or the external storage units.

20. The system of claim 12, wherein the site manager is to receive information, the information comprises metadata, topology of the recording system and location of stored video data.

21. The system of claim 12, wherein said site manger is to update in real-time the bit rate parameters and storage parameters.

22. The system of claim 12, wherein the site manager is to optimize performance of the video cameras based on pre-defined data and real-time data according to varying requirements during different time periods.

23. An article comprising a computer-storage medium having stored thereon instructions that when executed by a processing platform, result in:
dynamically receiving over an Internet Protocol (IP) network from video cameras bit rate parameters related to video processing units of the respective video cameras, wherein the processing units are to process video data received in real-time and to output the video data for storage and real-time monitoring;
dynamically adjusting a bit rate of one of the processing units based on required bit rates of the processing units and bandwidth limitations of the network;
dynamically receiving internal storage parameters related to internal storage units of the video cameras and external storage parameters related to external storage units coupled to the video cameras via the network; and
instructing one of the video cameras where to store the video data based on the storage parameters and bandwidth limitations of the network.

24. The article of claim 23, wherein the instructions when executed further result in centrally optimizing the performance of the video cameras.

* * * * *